Jan. 16, 1951     M. J. MURRAY     2,538,262
METHOD OF PURIFYING SULFURIC ACID ALKYLATES
Filed Nov. 28, 1947
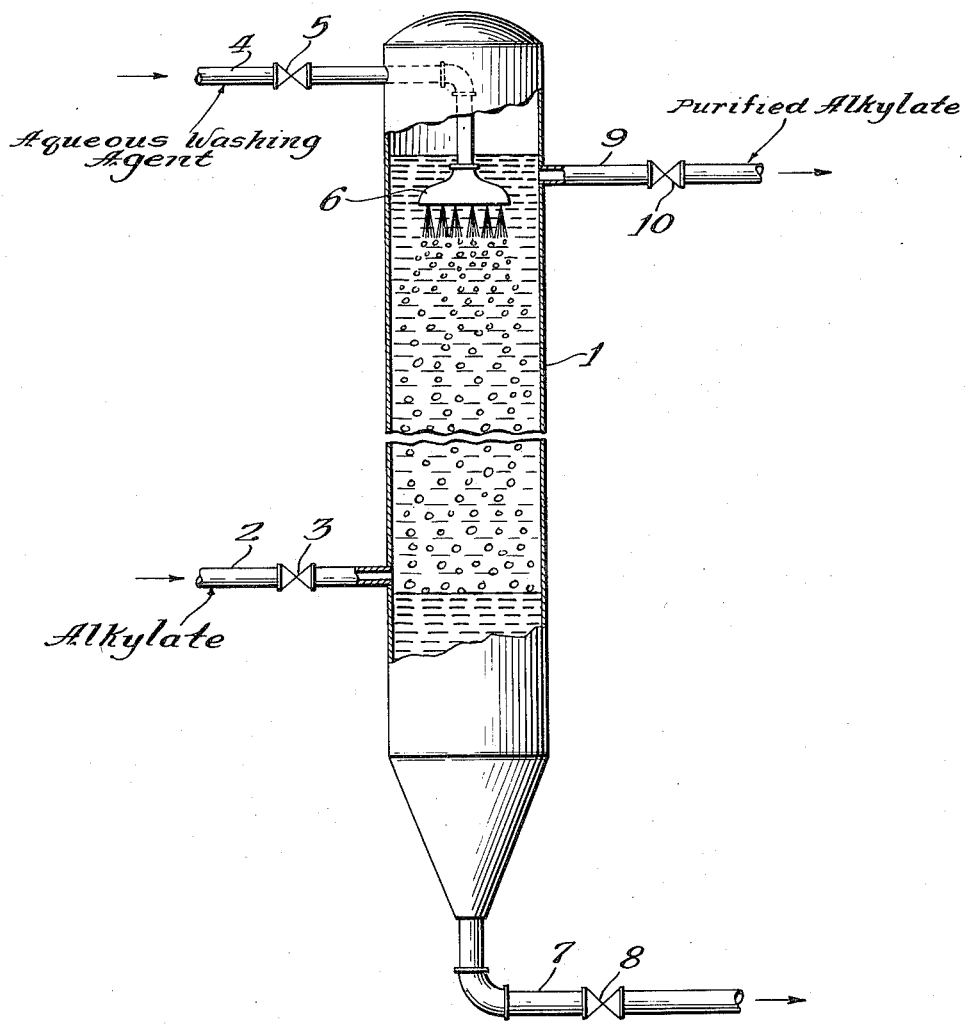
Inventor:
Maurice J. Murray
By: Maynard P. Venema
Attorney Patented Jan. 16, 1951

2,538,262

UNITED STATES PATENT OFFICE 2,538,262

METHOD OF PURIFYING SULFURIC ACID ALKYLATES

Maurice J. Murray, Clarendon Hills, Ill., assignor to Universal Oil Products Company, Chicago, Ill., a corporation of Delaware Application November 28, 1947, Serial No. 788,639

7 Claims. (Cl. 260—674)

This invention concerns a process for purifying alkylates formed by the alkylation of an alkylatable organic compound in the presence of sulfuric acid as catalyst and in particular concerns a method of removing water-soluble sulfur-containing impurities from said sulfuric acid alkylates whereby emulsification of the aqueous washing agent utilized in the process with the alkylate charged thereto is eliminated. More specifically, the invention relates to a method of purifying sulfuric acid alkylates of sulfur-containing impurities by contacting said alkylate with a slowly moving stream of an aqueous washing agent introduced into said alkylate at a velocity less than the critical velocity required to disperse said aqueous washing agent into droplets smaller than about 0.1 mm. in diameter.

The alkylation of organic compounds such as phenols, ethers, hydrocarbons, etc. in the presence of sulfuric acid as alkylation catalyst invariably results in the production of appreciable quantities (usually up to about 2 to 5% by weight of the total product, depending upon conditions) or organic products containing sulfur, such as sulfonic acids and sulfuric acid esters of the charging stock which dissolve in the alkylation product and which ordinarily must be removed from the crude alkylate product prior to the separation of desired alkylate fractions from the crude product by distillation. The strength of sulfuric acid commonly employed in most alkylation reactions is an acid exceeding about 75% sulfuric acid by weight, and generally acids containing from about 80 to about 98% sulfuric acid are utilized. Acids of the above concentration are of sufficient strength to effect a slight, but nevertheless significant, degree of sulfonation of the charging stock and/or product. The resulting undesirable sulfur-containing by-products ordinarily dissolve in the upper layer alkylate and when decanted from the lower layer comprising spent sulfuric acid catalyst, the by-product impurities are also present in the desired alkylate. In order to separate the desired alkylate fractions from excess charging stock, polyalkylated products and other by-products of the reaction, the crude alkylate as decanted from the alkylation reactor is usually distilled to separate the desired fractions corresponding to predetermined boiling point ranges. If the sulfur-containing impurities, which are usually in the nature of sulfonic acids and sulfuric acid esters, are allowed to remain in the crude alkylate and the impure mixture subjected to distillation, the sulfur-containing impurities tend to decompose at least slightly to liberate acidic compounds which tend further to enhance the further decomposition of the compounds present in the still, liberating sulfur dioxide and forming tarry deposits which not only reduce the yield of desired alkylate but also introduce processing complications in the production of the alkylate. The decomposition is especially evident when high boiling alkylate products are produced which when distilled at their high boiling points, tend to enhance the aforementioned decomposition.

The prior art has recognized the problem associated with the production of sulfuric acid alkylates and of the necessity of purifying the alkylates of sulfur-containing impurities. In general, the remedy has been to remove the sulfur-containing impurities by a washing procedure in which the crude alkylate is intimately admixed with a suitable washing agent, for example, by shaking or stirring the washing agent with the alkylate and separating the resulting phases. Due to the surface active properties of many of the impurities present in sulfuric acid alkylates, an emulsion invariably forms by the methods heretofore employed by the prior art. The resulting emulsions are relatively stable and require special handling procedures to break them down into their components, thus necessitating additional processing procedure which results in the loss of a portion of the alkylate product thereby. It has now been observed and these observations have been made the basis of the present invention that sulfuric acid alkylates containing undesired impurities, generally of a surface active nature, may be washed by utilizing a special washing procedure, hereinafter more specifically described, whereby the emulsion difficulties are eliminated and an alkylate product substantially purified of its sulfur-containing impurities is recovered therefrom.

It is one object of the present invention to remove by means of an aqueous washing agent the water-soluble impurities from an alkylate formed by the sulfuric acid alkylation of an alkylatable organic compound without the troublesome formation of an emulsion of said organic compound and said aqueous washing agent.

Another object of this invention is to remove sulfur-containing impurities present in sulfuric acid alkylates prior to distillation of said alkylates to eliminate thereby the formation of decomposition products normally formed when said alkylate is not subjected to said washing procedure.

In one of its embodiments, the present invention relates to a process for washing an alkylate formed by alkylating an alkylatable organic compound in the presence of a sulfuric acid alkylation catalyst by contacting the same with a liquid aqueous washing agent, said process being further characterized in that said alkylate is contacted in liquid state with said liquid aqueous washing agent, one of said liquids being introduced into the other of said liquids as a slowly moving stream having a velocity less than the critical velocity required to form an emulsion between said liquids, thereafter countercurrently settling the resulting liquid phases and separating an alkylate phase substantially free of sulfur-containing organic compounds from the aqueous phase.

In accordance with one of its more specific embodiments, the present invention concerns a process for removing sulfonic acids and sulfuric acid esters from an alkyl aromatic hydrocarbon charging stock in the presence of sulfuric acid as alkylation catalyst which comprises introducing a small slow stream of water into a given quantity of crude alkyl aromatic hydrocarbon product at a velocity less than that required to disperse said stream of water into droplets smaller than about 0.1 mm. in diameter, countercurrently settling the resulting aqueous phase and separating the same from the purified alkyl aromatic hydrocarbon phase.

Other embodiments and objects of the present invention relating to specific conditions applicable in the present washing procedure and to other factors involved in the present process will be hereinafter referred to in greater detail in the following further description of the invention.

In accordance with the present method of purifying sulfuric acid alkylates of water-soluble, sulfur-containing impurities retained by the alkylate layer formed in the alkylation reaction by virtue of the action of the sulfuric acid alkylation catalyst on the charging stock and/or product of the reaction, said alkylate as decanted in its crude state from the used alkylation acid is contacted with an aqueous washing agent either by introducing the crude alkylate in a small thin stream into said aqueous washing agent, or, alternatively, reversing the order of addition by introducing the aqueous washing agent as a slow thin stream into a mass of the alkylate. The addition of one material to the other, whether it be the washing agent to the alkylate or the reverse order of addition, is effected under such conditions that the addendum does not form droplets of a size sufficiently small to result in the formation of an emulsion with the other phase present in the system. In general, it has been found that the critical droplet size for emulsion formation between an alkylate phase and an aqueous phase in the presence of small amounts of sulfur-containing compounds such as the sulfonic acid derivatives of the alkylate which act as emulsifying agents, is approximately 0.1 mm. in diameter. The basic principle on which the process of this invention operates embodies the above observation in that emulsification between the sulfuric acid alkylate charging stock and the aqueous washing agent is prevented by contacting either the alkylate or washing agent with the other of said materials under such conditions that droplets smaller than about 0.1 mm. in diameter are not formed during the washing operation. Thus, the distinguishing feature of the present method of washing sulfuric acid alkylates is the regulation of the rate of introducing the addendum into the other liquid material so as to avoid dispersion of the addendum phase into droplets smaller than about 0.1 mm. in diameter. The present method accomplishes this object and yet effects substantially complete removal of sulfur-containing impurities from the sulfuric acid alkylate by introducing the addendum as a small thin stream into the other material. In one of the methods hereinin provided for contacting the alkylate with the aqueous washing agent whereby said alkylate is the addendum in respect to the washing agent, said alkylate may be introduced into the bottom of a vertical column of the aqueous washing agent and allowed to percolate upwardly by virtue of its lower specific gravity through the aqueous phase. The operation may be conducted batchwise or continuously, and when the latter is employed, countercurrent flow is preferred. In the latter continuous method, the purified alkylate is removed from the top of the washing column, while spent aqueous washing agent in which the sulfur-containing impurities originally present in the alkylate are dissolved is removed from the bottom of the washing column. The operation may also be effected continuously in a series of countercurrent washing columns, the respective raffinate and extract phases being charged into subsequent washing columns in the series.

Of the alternative methods hereinabove noted for washing sulfuric acid alkylates, the generally preferred method comprises introducing the aqueous washing agent in the form of a thin, slowly moving stream into the alkylate and thereafter permitting the resulting heavier droplets of washing agent to slowly descend to the bottom of the washing column below the alkylate layer. This process may also be operated on a batch or continuous basis, the aqueous washing agent being removed from the bottom of the column while the purified alkylate is removed from the top thereof.

The efficiency of the washing operation is dependent upon at least two factors: The total interfacial surface of the droplets suspended in the other phase and the time of contact between the phases formed in the washing operation by virtue of their immiscibility. It is therefore desirable for most efficient operation, to disperse the addendum phase into droplets having as small a diameter as possible without forming an emulsion which occurs when the droplet size is below about 0.1 mm. in diameter. As the droplet size is reduced, there is not only an increase in the total interfacial area between phases but a further advantage is obtained in that the reduction in the size of droplets increases the period of suspension of the droplets in the other phase. However, decreasing the size of the droplets below about 0.1 mm. is believed to result in the formation of an emulsion wherein the phases are separated only with great difficulty or by the application of special techniques. For this reason it is desirable that the droplet size be maintained greater than about 0.1 mm. in diameter. The rate of introducing the addendum phase to obtain the desired dispersion thereof without formation of an emulsion depends upon the nature of the alkylate, that is its viscosity, its molecular weight and structure which determine its tendency to form an emulsion with water, and the surface activity of its sulfonates. The time of suspension of the droplets of addendum phase in the suspending phase is desirably from about 0.5 to about 30 seconds and may be increased by increasing the height of the suspending phase, by countercurrent flow of the suspending phase or by maintaining some form of agitation such as a stirring paddle which revolves slowly in the liquid suspending phase to decrease the rate at which the suspended droplets of addendum fall through the suspending medium.

The material herein utilizable as charging stock to the washing procedure has been designated broadly as a sulfuric acid alkylate formed by reacting an alkylatable organic compound with an olefin or olefin-acting alkylating agent in the presence of sulfuric acid as alkylation catalyst. By alkylatable organic compounds is meant those compounds containing a hydrogen atom capable of being replaced by an alkyl group with the aid of an alkylation catalyst such as sulfuric acid. Olefin-acting alkylating agents include those organic compounds whose structures contain a hydrocarbon radical substitutable on the recipient carbon atom of the alkylatable organic compound containing the replaceable hydrogen atom. Thus alcohols, alkyl halides, etc. represent olefin-acting compounds containing an alkyl group substitutable on an alkylatable organic compound. The present process is particularly applicable to the alkylates formed by alkylating an aromatic hydrocarbon, such as benzene, toluene, xylene, etc. with a relatively straight chain olefin containing from about 9 to about 18 carbon atoms per molecule, which alkylates form upon sulfonation very active detergents. In the alkylation of such compounds with sulfuric acid as alkylation catalyst, a portion of the alkylate product is unavoidably sulfonated and the resulting sulfonic acid dissolves in the alkylate phase. Also, a portion of the aromatic and/or olefinic charging stock may become sulfonated and likewise dissolve in the alkylate phase. These products decompose readily on distillation of the alkylate and if not removed, from undesirable sludges and colored decomposition products. Their removal from the alkylate prior to distillation is therefore desirable, but their presence causes emulsification difficulties when utilizing an aqueous washing agent as hereinabove noted. The present process is designated to overcome said difficulties.

The aqueous washing agent herein specified as one of the charging stocks involved in the washing operation to remove sulfur-containing impurities present in the sulfuric acid alkylate may be water itself or a dilute aqueous solution of an alkaline neutralizing agent such as an alkali hydroxide, an alkali carbonate, ammonia, etc. which may react with the generally acidic sulfur-containing impurities to form neutral salts thereof. When present in the aqueous washing agent, the neutralizing component thereof is preferably maintained below about 5% by weight of the solution in order to prevent emulsification of the alkylate which may occur when the neutralizing component is present in the washing agent in greater concentrations. The aqueous washing agent is preferably maintained at a temperature at which the solubility of the sulfur-containing impurities is greatest therein, but necessarily below the boiling point of either phase present in the system. The lower temperature limit of operability is in general the temperature at which the phases become viscous or congeal at or near the freezing point of the phases. Suitable temperatures applicable to the present process are temperatures within the range of from about 10° to about 90° C., preferably from about 20° to about 50° C.

The preferred method of operation whereby water or other aqueous washing agent is introduced into the alkylate as a thin slowly moving stream is illustrated in the accompanying diagram which represents a continuous method of operation in which the aqueous washing agent is admitted into a column of the alkylate as a spray below the surface of the alkylate. A sulfuric acid alkylate having present therein various water-soluble sulfur-containing impurities formed as a result of the reaction of the alkylation charging stock with sulfuric acid is introduced into washing column 1 through conduit 2 containing valve 3 near the bottom of the column, or at a point at least below the surface of the liquid contained therein. An aqueous washing agent such as water itself is introduced into column 1 in the upper portion thereof through conduit 4 containing valve 5 and is distributed throughout the cross-sectional area of the column by discharge through the small openings in nozzle 6 as a plurality of thin, slowly moving streams which enter the alkylate phase below the surface of said alkylate. The rate of introducing the aqueous washing agent into the alkylate phase is adjusted so that the thin streams of washing agent ejected through the small openings in nozzle 6 disperse into small liquid droplets within the alkylate phase which tend to suspend the droplets. The rate, on the other hand, is such that the resulting droplets are larger than about 0.1 mm. in diameter. The aqueous droplets which are relatively more dense than the alkylate descend through the column of alkylate into the lower portion of the washing column where the droplets agglomerate and form a separate phase comprising a lower layer in said washing column. Spent aqueous washing agent containing the dissolved sulfur-containing impurities present in the original alkylate is continuously withdrawn from the bottom of washing column 1 through pipe 7 containing valve 8 which controls the rate of withdrawal at the same rate that the washing agent is introduced through conduit 4 as described above. As the impurities present in the original alkylate are removed by virtue of the descending droplets of washing agent through the same, the washed alkylate is gradually forced to the top of column 1, countercurrent to the descending droplets of washing agent and exits column 1 through pipe 9 containing valve 10. The purified alkylate may thereafter be dried and/or distilled, as desired, without the accompanying formation of decomposition products of the sulfur-containing impurities originally present in the sulfuric acid alkylate.

The present process is further illustrated by the following example which describes a method of purifying a toluene alkylate which is produced for the manufacture of detergents therefrom. The process conditions and method of operation described therein are not to be interpreted as limiting the scope of the invention hereinabove presented in accordance with any of the specified conditions.

A sulfuric acid alkylation catalyst containing 93% sulfuric acid was maintained in a stirred reactor at a temperature of from about 0° to about 5° C. as a mixture of 10 parts of toluene and one part of an olefinic hydrocarbon fraction having a boiling point of from about 170° to about 225° C. containing olefins having from about 9 to about 15 carbon atoms per molecule was introduced with stirring into the chilled sulfuric acid catalyst. The temperature was maintained within the above range during the course of the resulting exothermic alkylation reaction. The reaction resulted in the formation of a two phase mixture, a lower phase comprising chiefly used sulfuric acid and an upper hydrocarbon phase containing unreacted charging stock and alkylate product. The upper phase was decanted from the lower spent sulfuric acid phase and introduced into a separatory funnel wherein the minute droplets of sulfuric acid suspended therein were allowed to settle. Analysis of the remaining hydrocarbons indicated that the latter contained approximately 0.3% of sulfur-containing impurities as sulfonic acids of the olefin and aromatic charging stocks and of the alkyl aromatic product.

The alkylate product as prepared above, containing the indicated 0.3% sulfur-containing impurities, was washed by spraying water in the form of thin, slowly moving streams into a separatory funnel containing the alkylate. In the washing operation the water streams were introduced into the alkylate below the surface of the hydrocarbons, resulting in the formation of aqueous droplets having a diameter of from about 0.2 to about 0.8 mm. in diameter. The alkylate after washing for about 1 minute contained substantially less than 0.1% sulfur-containing impurities.

I claim as my invention:

1. A process for removing water-soluble sulfonic acids from alkylates produced by sulfuric acid alkylation, which comprises contacting the alkylate in liquid form with a substantially aqueous washing liquid comprising a solvent for said sulfonic acids by introducing one of said liquids into a body of the other liquid in the form of droplets of a size greater than 0.1 mm. in diameter and passing said droplets through said body in a vertical direction, and separating the thus contacted liquids into an alkylate phase and an aqueous phase.

2. The process of claim 1 further characterized in that said other liquid is moved countercurrently to said droplets during the contacting step.

3. The process of claim 1 further characterized in that said alkylate is an alkyl aromatic hydrocarbon product formed by the alkylation of an aromatic hydrocarbon in the presence of sulfuric acid.

4. The process of claim 1 further characterized in that said alkylate comprises an alkyl toluene hydrocarbon having an alkyl group containing from about 9 to about 18 carbon atoms.

5. The process of claim 1 further characterized in that the washing liquid is introduced in the form of droplets into a body of the liquid alkylate.

6. The process of claim 1 further characterized in that the washing liquid is introduced in the form of droplets into the upper portion of a body of the liquid alkylate and the droplets permitted to descend through said body.

7. The process of claim 6 further characterized in that the liquid alkylate of said body is passed upwardly in countercurrent contact with the descending droplets of washing liquid.

MAURICE J. MURRAY.

REFERENCES CITED

The following references are of record in the file of this patent:

UNITED STATES PATENTS

| Number | Name | Date |
| --- | --- | --- |
| 400,633 | Cazin | Apr. 2, 1889 |
| 2,150,491 | Cope | Mar. 14, 1939 |
| 2,340,168 | Allot et al. | Jan. 25, 1944 |
| 2,364,892 | Elgin | Dec. 12, 1944 |
| 2,383,056 | Goldsby | Aug. 21, 1945 |